(12) United States Patent
King

(10) Patent No.: US 10,156,341 B1
(45) Date of Patent: Dec. 18, 2018

(54) LIGHTING MODULE COMPRISING A MASK USING NON UNIFORM DESIGNS

(71) Applicant: Valeo North America, Inc., Troy, MI (US)

(72) Inventor: Robert King, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/626,887

(22) Filed: Jun. 19, 2017

(51) Int. Cl.
*F21V 3/00* (2015.01)
*F21V 7/06* (2006.01)
*F21V 11/00* (2015.01)
*F21V 5/04* (2006.01)

(52) U.S. Cl.
CPC ............ *F21V 3/00* (2013.01); *F21V 5/04* (2013.01); *F21V 7/06* (2013.01); *F21V 11/00* (2013.01)

(58) Field of Classification Search
CPC ...... F21V 3/00; F21V 5/04; F21V 7/06; F21V 11/00
USPC ........................................................ 362/516
See application file for complete search history.

(56) References Cited

U.S. PATENT DOCUMENTS

| | | | | |
|---|---|---|---|---|
| 3,401,596 A * | 9/1968 | Hirsch | ............... | F21L 4/00 353/43 |
| 4,967,317 A * | 10/1990 | Plumly | ............... | G08B 7/062 362/243 |
| 5,975,725 A * | 11/1999 | Ireland-Stacy | ............... | F21V 1/00 362/351 |
| 6,174,075 B1 * | 1/2001 | Fuwausa | ............... | A41D 27/085 362/103 |
| 6,302,566 B1 * | 10/2001 | Cohon | ............... | F21V 1/04 362/351 |
| 6,729,747 B1 * | 5/2004 | Wirayani | ............... | F21V 1/12 362/355 |
| 7,150,539 B2 * | 12/2006 | Chen | ............... | G09F 13/04 362/235 |
| 7,824,078 B2 * | 11/2010 | Peng | ............... | G06F 1/1616 362/253 |
| 8,113,695 B2 * | 2/2012 | Meinke | ............... | B60Q 1/2669 362/214 |
| 2003/0099104 A1 * | 5/2003 | Hou | ............... | F21L 4/005 362/202 |
| 2004/0218398 A1 * | 11/2004 | Fischer | ............... | B60R 13/00 362/500 |
| 2011/0235337 A1 * | 9/2011 | Jacksen | ............... | F21V 3/04 362/308 |
| 2012/0256543 A1 * | 10/2012 | Marcove | ............... | B60Q 1/2607 315/77 |
| 2015/0291085 A1 * | 10/2015 | Manning | ............... | B60Q 1/2619 362/516 |

* cited by examiner

*Primary Examiner* — Bryon T Gyllstrom
(74) *Attorney, Agent, or Firm* — Oblon, McClelland, Maier & Neustadt, L.L.P.

(57) ABSTRACT

A lighting device for motor vehicle comprising a light source configured to emit light rays; an optical system optically coupled to a first portion of said light rays and configured to output said first portion of the light rays to provide a vehicle lighting function; and a mask optically coupled to a second portion of said light rays. The mask is configured to pass a projecting part of said second portion of the light rays and to cut off passage of a blocked part of said second portion of the light rays such that the second portion of the light rays forms a pattern of light and shadows on a surface.

15 Claims, 10 Drawing Sheets

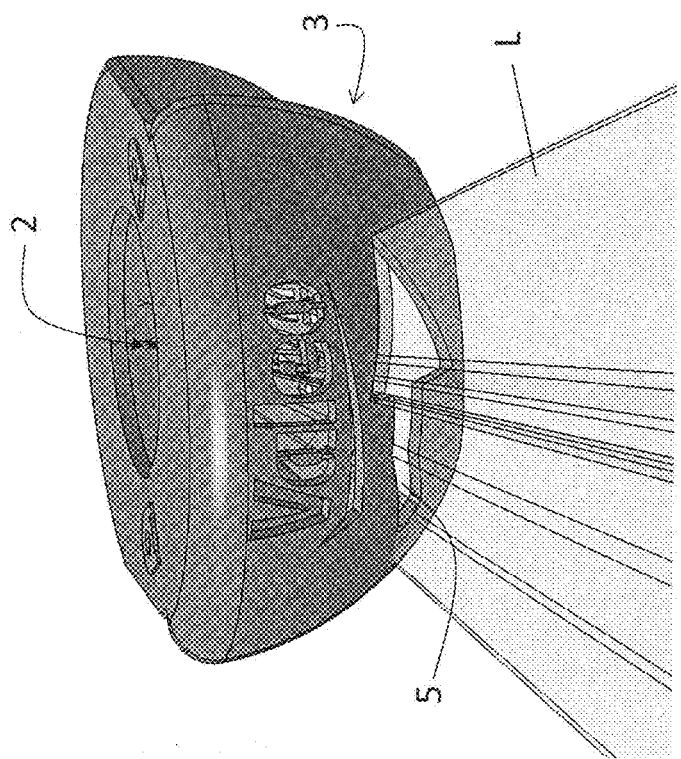

LIGHTING MODULE COMPRISING A MASK USING NON UNIFORM DESIGNS

FIELD OF THE DISCLOSURE

This disclosure relates generally to lighting module for motor vehicle and to lighting device for motor vehicle comprising the lighting module. More particularly the present disclosure relates to lighting module comprising a mask using non uniform designs.

DESCRIPTION OF THE RELATED ART

A lighting device for motor vehicle generally comprises a housing closed by an outer lens in which a lighting module is placed. The light module comprises a light source as well as a shaping optic for forming, focusing and/or guiding the light rays originating from the light source. Various mechanical and electrical elements are also present in the light module in order to ensure the assembly and/or the electrical supply of the light source and of the optical devices. In order to protect and conceal these elements, the lighting module comprises a mask which may be of different shapes and which comprises a portion placed under the shaping optics.

In some other lighting modules, the role of the mask is to block the unwanted rays of the luminous flux emitted by the emission elements in order for only a narrow and targeted beam to enter the optical reflecting devices, so that on the one hand the rays are reflected correctly therein toward the outlet face of the module and on the other hand no ray is reflected at an adjoining walls delimiting these optical deflection devices.

It is clear that, for a given lighting module, the position of the mask between the light source and the optical deflection devices must be determined with precision and that the shape of the mask must be a function of the shape of the optical deflection devices, for the mask to be able to block the first rays deemed unwanted and to allow to pass the rays of the narrow beam directed towards the optical deflection devices. Particular attention is then paid to the machining of the mask and to the devices for positioning this mask relative to the light emission devices. Therefore a great amount of light from the light source is wasted and might contribute to parasitize the passing rays.

On the other hand there is an increasing demand to customize interior and exterior of lighting devices with light and shadows effects.

SUMMARY

Accordingly, one object of the present disclosure is to a lighting device for a motor vehicle with a mask to customize interior and exterior of lighting devices with light and shadows effects.

Another object is to provide a method of manufacturing a mask for a lighting device of a motor vehicle. These and other object of the disclosure may be achieved by one or more of the following aspects.

One aspect of the present disclosure includes a lighting device for motor vehicle. The lighting device comprises a light source configured to emit light rays, an optical system optically coupled to a first portion of said light rays and configured to output said first portion of the light rays to provide a vehicle lighting function, and a mask optically coupled to a second portion of said light rays. The mask is configured to pass a projecting part of said second portion of the light rays and to cut off passage of a blocked part of said second portion of the light rays such that the second portion of the light rays forms a pattern of light and shadows on a surface.

In one embodiment, at least a portion of the projecting part of the second portion of light rays are directed by the mask to cross at least a part of the first portion of light rays.

In one embodiment, the mask comprises at least one aperture such that the pattern is a light distribution, a logo, a word and/or a shape.

In one embodiment, the at least one aperture has a shape of an arrow such that the pattern forms an arrow.

In one embodiment, the at least one aperture has a shape of letters such that the pattern forms a word.

In one embodiment, the mask surrounds the optical system.

In one embodiment, the mask is located between the light source and the optical system.

In one embodiment, the mask is made from plastic material, ceramic material, glass material and/or metal material.

In one embodiment, the optical system comprises a lens, a reflector and/or a lightguide.

Another aspect of the present disclosure includes a lighting device for motor vehicle comprising a light source configured to emit light, an optical system optically coupled to the light source and configured to output said light to provide a vehicle lighting function; and a mask optically coupled to the light source and configured to project an ornamental light distribution on a surface.

Another aspect of the present disclosure includes a method of manufacturing a mask for a lighting device of a motor vehicle, the lighting device for motor vehicle comprising a light source configured to emit light rays; an optical system optically coupled to a first portion of said light rays and configured to output said first portion of the light rays to provide a vehicle lighting function; and a mask optically coupled to a second portion of said light rays, the mask being configured to pass a projecting part of said second portion of the light rays and to cut off passage of a blocked part of said second portion of the light rays such that the second portion of the light rays forms a pattern of light and shadows on a surface the method comprising the following steps:

a. creating a pattern on the surface that it will be created on;
   b. breaking a contour of the pattern into multiple curves;
   c. creating surfaces from the curves and the light source;
   d. getting a solid structure from the surfaces
   e. subtracting solid from the actual mask to get the apertures.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 10 is a schematic view of the step 105 of FIG. 5

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

As noted above, the role of the mask is to block unwanted light rays from the light source that could induce glare in the overall vehicle light beam. The blocked light rays can then be reabsorbed by the light source and/or absorbed by the mask. This blocked light is then lost for nothing. On the other hand there is an increase on customizable lighting device such as headlamp, interior lighting, and rearlamp. This is generally achieved by having dedicated lighting module inside the lighting device. Further, these lighting modules greatly increase the cost and complexity of a vehicle lighting device.

Figure 1:
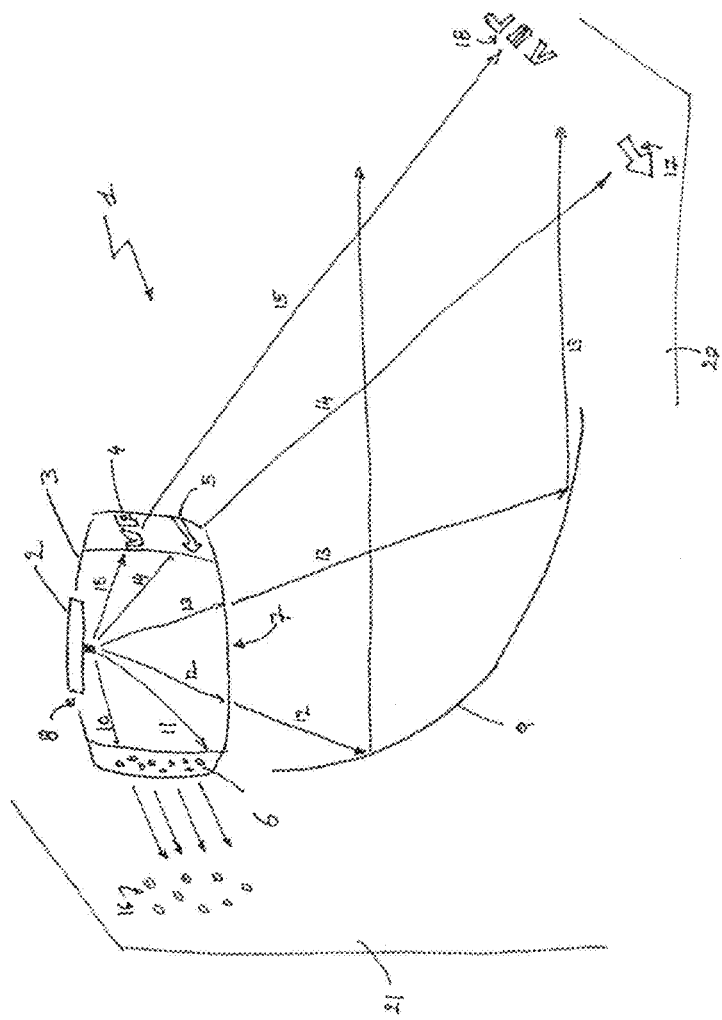
FIG. 1 is a side cross-sectional view of the lighting device for a motor vehicle, according to an exemplary embodiment of the present disclosure.

FIG. 1 s a side cross-sectional view of the lighting device for a motor vehicle, according to an exemplary embodiment of the present disclosure.

The lighting device 1 comprises a housing and an outer glass closing the housing. The surface 21 is a surface of the housing. The lighting device 1 further comprises a light source 2, a parabolic reflector 9, which is an optical system, and a mask 3.

The light source 2 is placed at the focal point of the parabolic reflector 9. The light source 2 is configured to emit light rays 10, 11, 12, 13, 14, 15. The reflector 9 is set up to reflect a first portion of the light rays 12, 13 from the light source 2 toward the road 20 in order to provide a vehicle lighting function.

Figure 2:
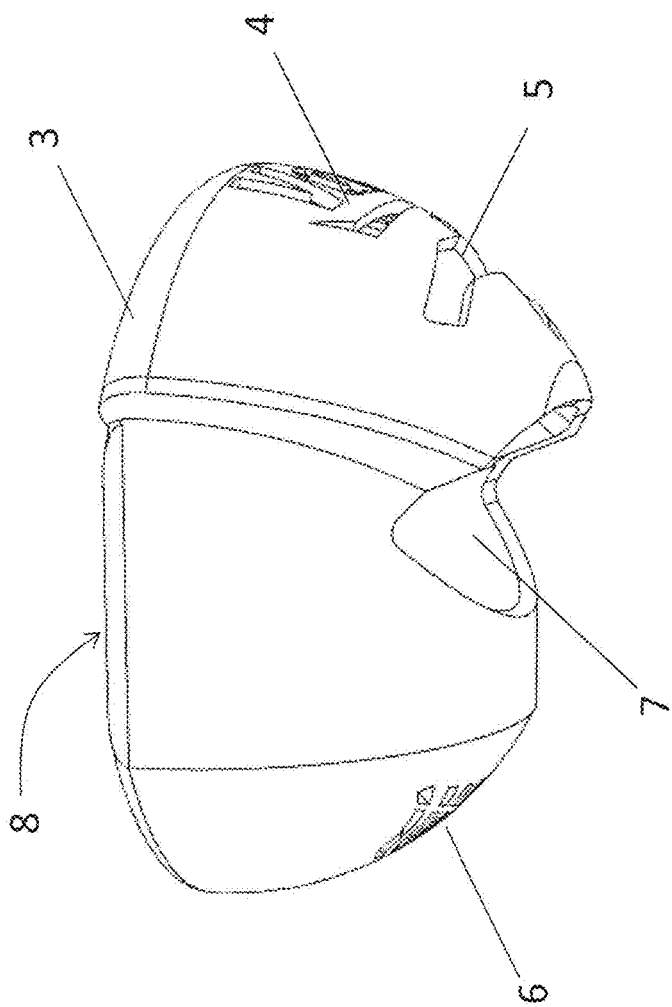
FIG. 2 is a schematic side view of the mask of FIG. 1, according to an exemplary embodiment of the present disclosure.

The mask 3 is placed between the light source 2 and the reflector 9. As illustrated on FIG. 1 and FIG. 2, the mask has on top aperture 8 which altitude is the same as the light source 2 with respect to the reflector 9. It also has a lower aperture 7 to allow a first portion of light rays 12, 14 to hit the reflector. It further has on its sides apertures 6, 4 and 5 so some light rays 11 of a second portion of light rays will be blocked and some light rays 10, 14, 15 of the second portion will be projected on the wall of the housing 2 and on the road 20 to form patterns of light 16, 17, 18. The patterns of light can be a play of light and shadows 16, leading to an ornamental light distribution, and/or a shape, like an arrow 17, and/or a logo 18. The light rays 14 and 15 will eventually cross the pathway of light rays 13, 14 without interfering with them.

Figure 3:
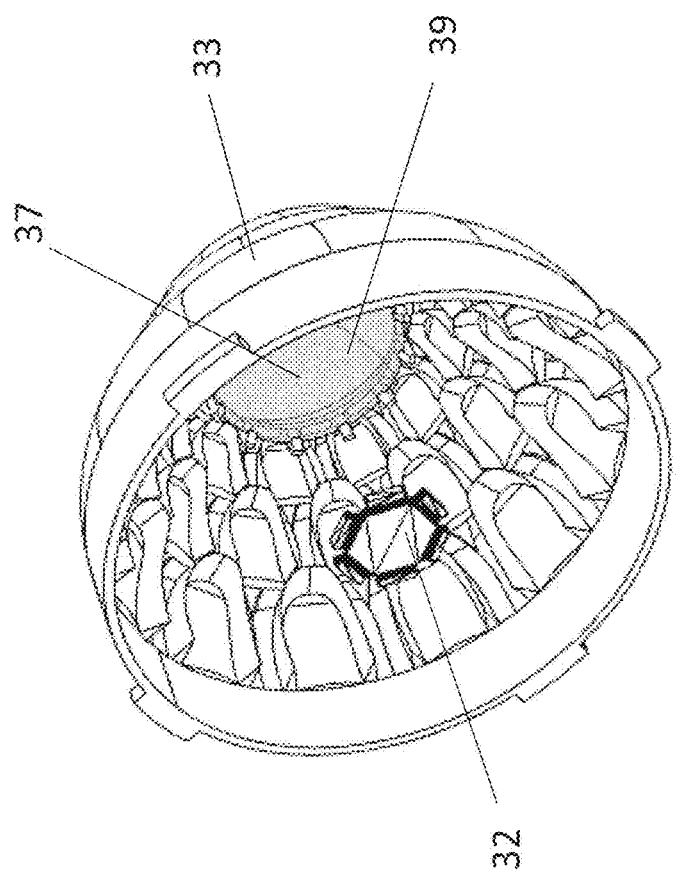
FIG. 3 is a schematic rear view of the lighting device for a motor vehicle, according to an exemplary embodiment of the present disclosure.
Figure 4:
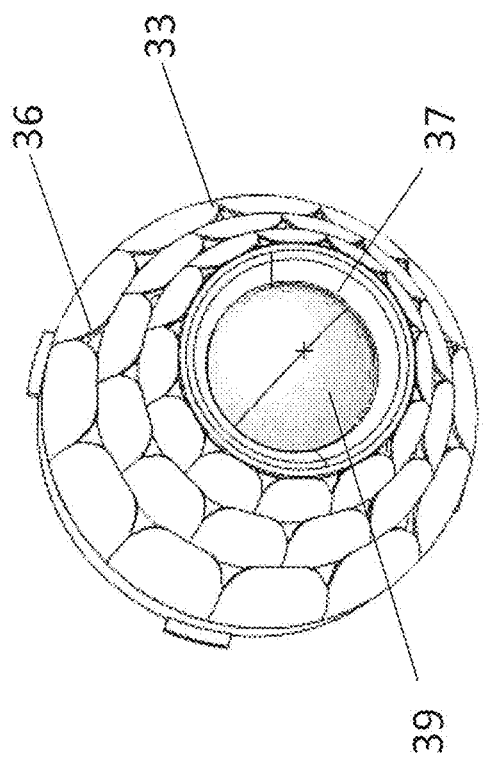
FIG. 4 is a schematic front view of the lighting device of FIG. 3, according to an exemplary embodiment of the present disclosure.

FIG. 3 is a schematic rear view of the lighting device for a motor vehicle according to the second embodiment of the present disclosure, and FIG. 4 is a schematic front view of the lighting device of FIG. 3, according to the second embodiment of the present disclosure. The lighting device 31 comprises a light source 32 and a lens 39, which is an optical system. The light source 32 is placed at the focus point of the lens 39. The lighting device 31 further comprises a mask 33 which is disposed between the light source 32 and the lens 39. The mask has a lens aperture 37 to hold the lens. The lens aperture 37 surrounds lens. That layout will let a first portion of light rays from the light source 32 to provide a vehicle lighting pattern after going through the lens 39.

The mask 33 also has ornamental apertures 36 to let pass a projecting part of a second portion of the light rays from the light source and to cut off part of light rays of the second portion of the light rays from the light source 32. This leads to a pattern of light and shadows on the road or on any surface on the pathway of the light rays of the second portion. In this embodiment it therefore projects an ornamental light distribution.

In some embodiments, the mask 3, 33 can be made from plastic material, ceramic material, glass material and/or metal material.

In some embodiments, masks are only made by selective laser sintering (SLS) because the design is too complex for molding processes. SLS technology uses a laser to harden and bond small grains of plastic, ceramic, glass, metal, or other materials into layers in a 3D dimensional structure. The laser traces the pattern of each cross section of the 3D design onto a bed of powder. After one layer is built, the bed lowers and another layer is built on top of the existing layers. The bed then continues to lower until every layer is built and the part is complete.

In some embodiments, the light source 2, 32 is solid state light source such as an LED, an OLED, . . . .

Figure 5:
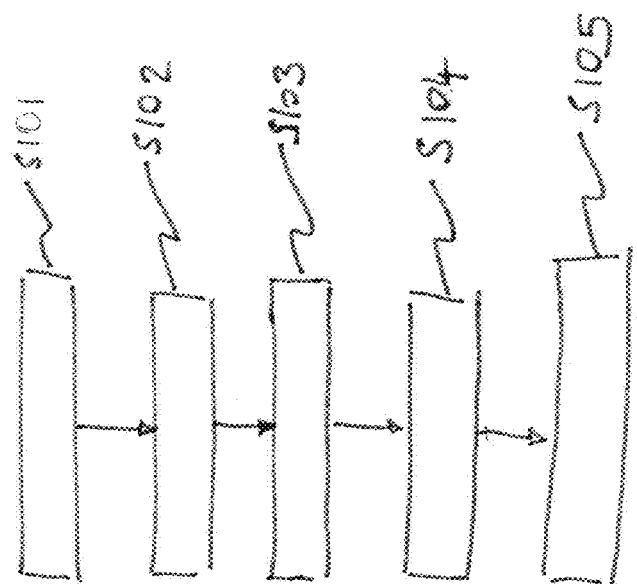
FIG. 5 is a simplified block diagram of the method of manufacturing a mask for a lighting device of a motor vehicle in which embodiments of the invention disclosed herein may be implemented.
Figure 6:
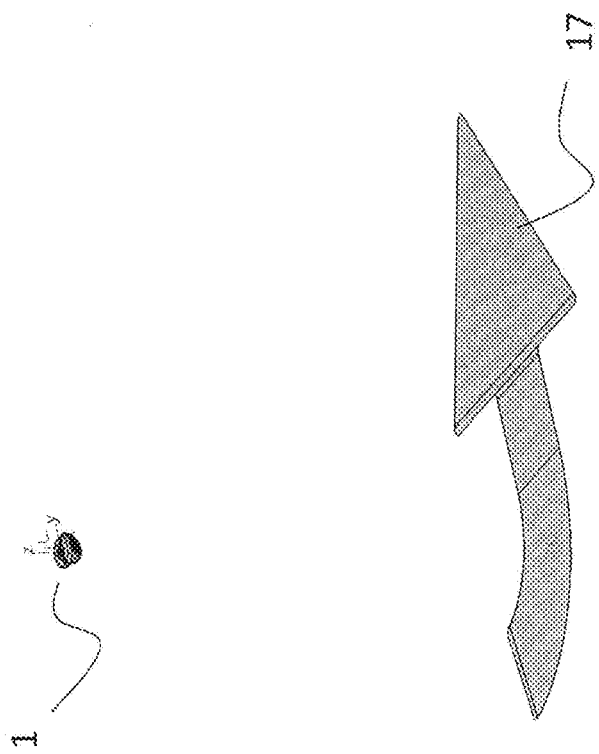
FIG. 6 is a schematic view of the step 101 of FIG. 5.
Figure 7:
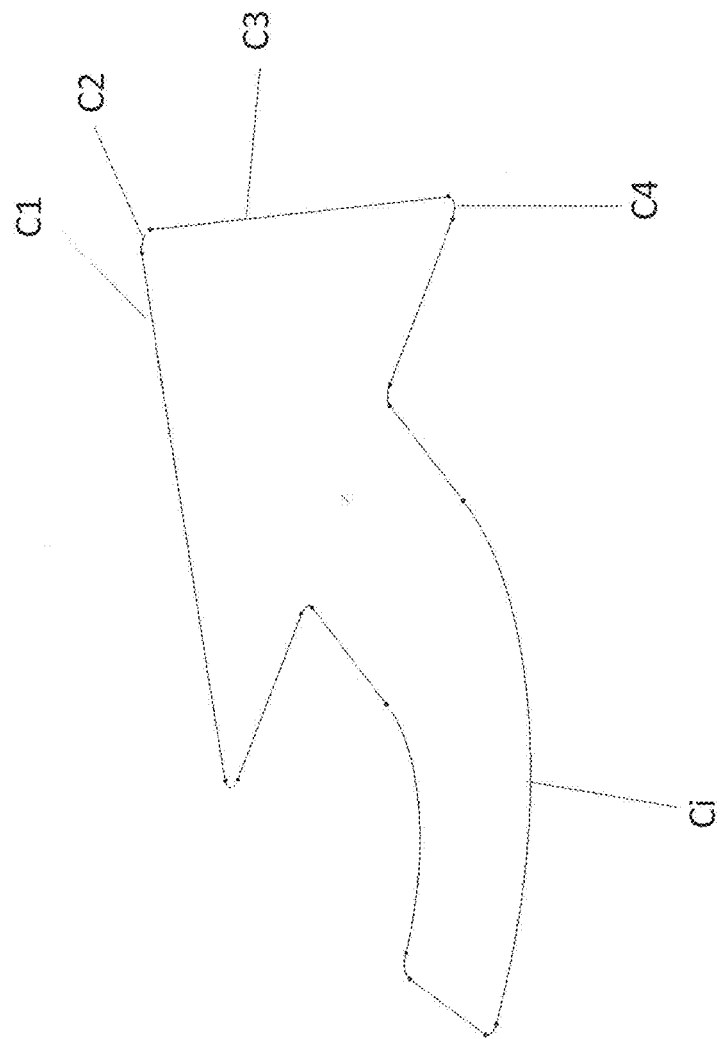
FIG. 7 is a schematic view of the step 102 of FIG. 5.
Figure 8:
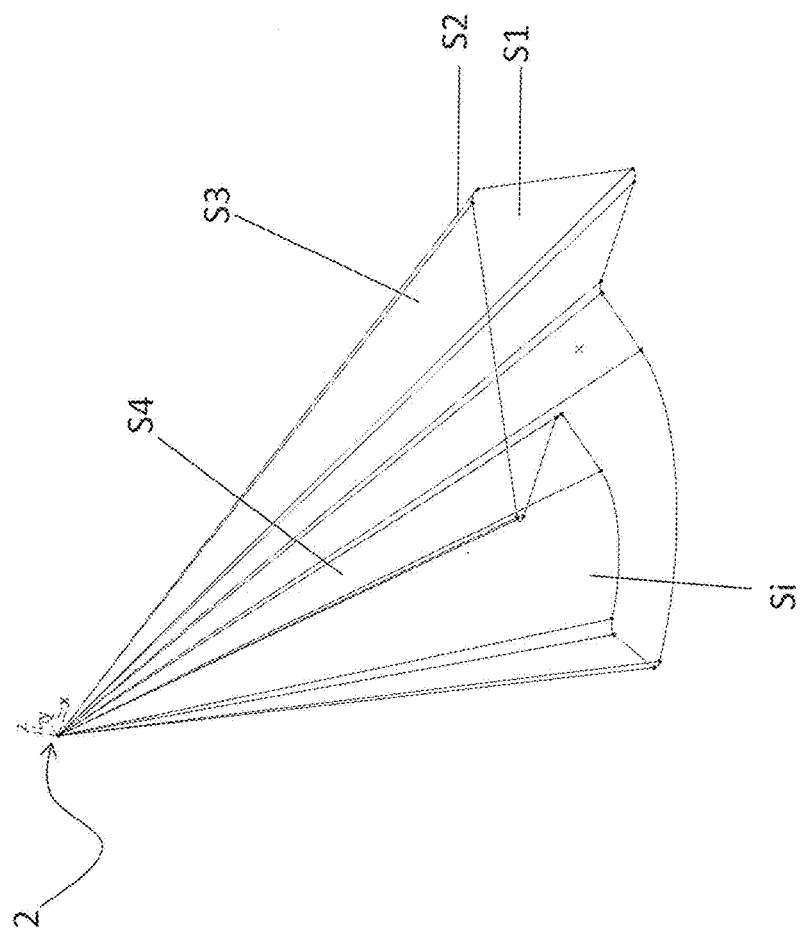
FIG. 8 is a schematic view of the step 103 of FIG. 5.
Figure 9:
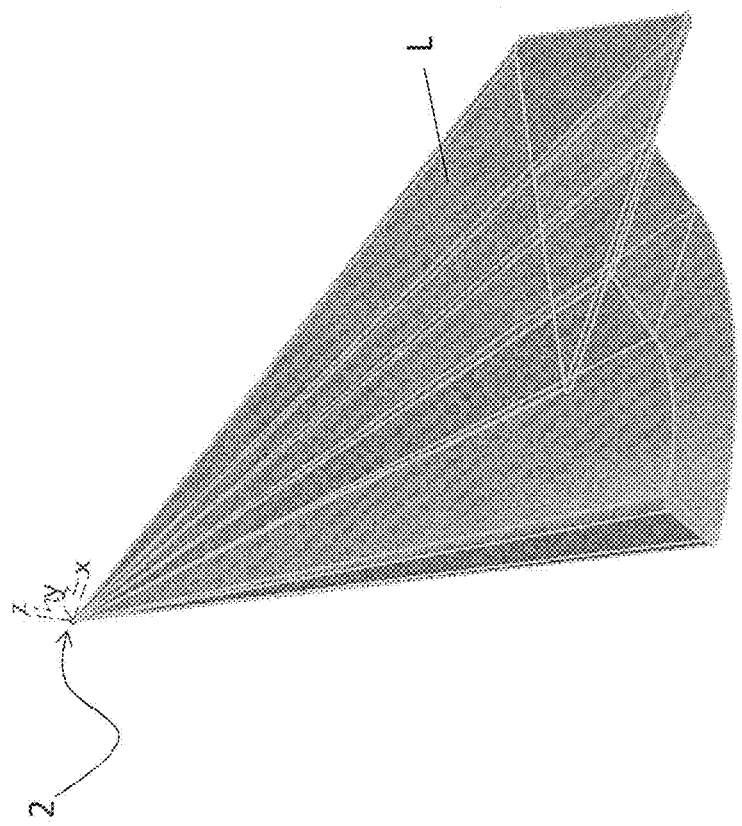
FIG. 9 is a schematic view of the step 104 of FIG. 5.

FIG. 5 is a simplified block diagram of the method of manufacturing a mask 3, 33 for a lighting device 1 of a motor vehicle in which embodiments of the invention disclosed herein may be implemented. The lighting device 1 comprises a light source 2 configured to emit light rays; an optical system 9 optically coupled to a first portion of said light rays and configured to output said first portion of the light rays to provide a vehicle lighting function; and a mask 3, 33 optically coupled to a second portion of said light rays, the mask 3 being configured to pass a projecting part of said second portion of the light rays and to cut off passage of a blocked part of said second portion of the light rays such that the second portion of the light rays forms a pattern of light and shadows on a surface 20, 21. For clearness and conciseness the method will be explained for the first embodiment described therefore for the mask 3. The first step S101 is creating a pattern on the road 20 that it will be created on. As illustrated on FIG. 6, the desired pattern 17 is an arrow. The second step S102 is breaking a contour of the pattern into multiple curves Ci, where i is a positive integer starting at 1, as illustrated on FIG. 7. The third step S103 is creating surfaces Si, where i is a positive integer starting at 1, from the curves Ci and coming from the light source 2 as seen on FIG. 8. The step 104 is to transform the surfaces Si into a solid L as indicated on FIG. 9. The last step S105 is subtracting the solid L from the actual mask to get the desired aperture so the final mask 3 will allow light rays form the light source to project the desired image, here an arrow. These steps can be achieved by hand or the help of a CAD software.

While certain embodiments have been described, these embodiments have been presented by way of example only, and are not intended to limit the scope of the present disclosures. Indeed, the novel apparatuses and systems described herein can be embodied in a variety of other forms; furthermore, various omissions, substitutions and changes in the form of the apparatuses and systems described herein can be made without departing from the spirit of the present disclosures. The accompanying claims and their equivalents are intended to cover such forms or modifications as would fall within the scope and spirit of the present disclosures.

What is claimed is:

1. A lighting device for motor vehicle comprising:
   a light source configured to emit light rays;
   a mask including a first aperture and a second aperture, said light rays passing through the first aperture corresponding to a first portion of said light rays, said light rays passing through the second aperture corresponding a second portion of said light rays, and
   an optical system receiving said first portion of said light rays and configured to output said first portion of the light rays to provide a vehicle lighting function, said second portion of said light rays forming a pattern of light and shadows on a surface without passing through the optical system.

2. The lighting device of claim 1, wherein at least a part of the second portion of said light rays are directed by the mask to cross at least a part of the first portion of said light rays.

3. The lighting device of claim 1, wherein the second aperture is such that the pattern is a light distribution, a logo, a word and/or a shape.

4. The lighting device of claim 3, wherein the second aperture has a shape of an arrow such that the pattern forms an arrow.

5. The lighting device of claim 3, wherein the second aperture has a shape of letters such that the pattern forms a word.

6. The lighting device of claim 1, wherein the mask surrounds the optical system.

7. The lighting device of claim 1, wherein the mask is located between the light source and the optical system.

8. The lighting device of claim 1, wherein the mask is made from plastic material, ceramic material, glass material and/or metal material.

9. The lighting device of claim 1, wherein the optical system comprises a lens, a reflector and/or a lightguide.

10. A lighting device for motor vehicle comprising:
    a light source configured to emit light;
    a mask optically coupled to the light source and configured to project an ornamental light distribution on a surface, the mask including a first aperture and a second aperture, said light rays passing through the first aperture corresponding to a first portion of said light rays, said light rays passing through the second aperture corresponding a second portion of said light rays, and
    an optical system optically coupled to the light source and configured to output said light to provide a vehicle lighting function,
    wherein at least a part of the second portion of said light rays are directed by the optical system to cross at least a part of the first portion of said light rays.

11. The lighting device of claim 10, wherein the optical system is a reflector.

12. The lighting device of claim 10, wherein the optical system is a parabolic reflector.

13. A method of manufacturing a mask for a lighting device of a motor vehicle, the lighting device for motor vehicle comprising a light source configured to emit light rays;
    a mask including a first aperture and a second aperture, said light rays passing through the first aperture corresponding to a first portion of said light rays, said light rays passing through the second aperture corresponding a second portion of said light rays, and,
    an optical system receiving said first portion of said light rays and configured to output said first portion of the light rays to provide a vehicle lighting function, said second portion of said light rays forming a pattern of light and shadows on a surface, the method comprising:
    creating a pattern of light on the surface that the pattern will be created on;
    breaking a contour of the pattern into multiple curves;
    creating surfaces from the curves and the light source;
    getting a solid structure from the surfaces; and
    subtracting solid from the actual mask to get the apertures.

14. The method of claim 13, wherein the optical system is a reflector.

15. The method of claim 13, wherein the optical system is a parabolic reflector that causes at least a part of the second portion of said light rays to cross at least a part of the first portion of said light rays.

* * * * *